UNITED STATES PATENT OFFICE.

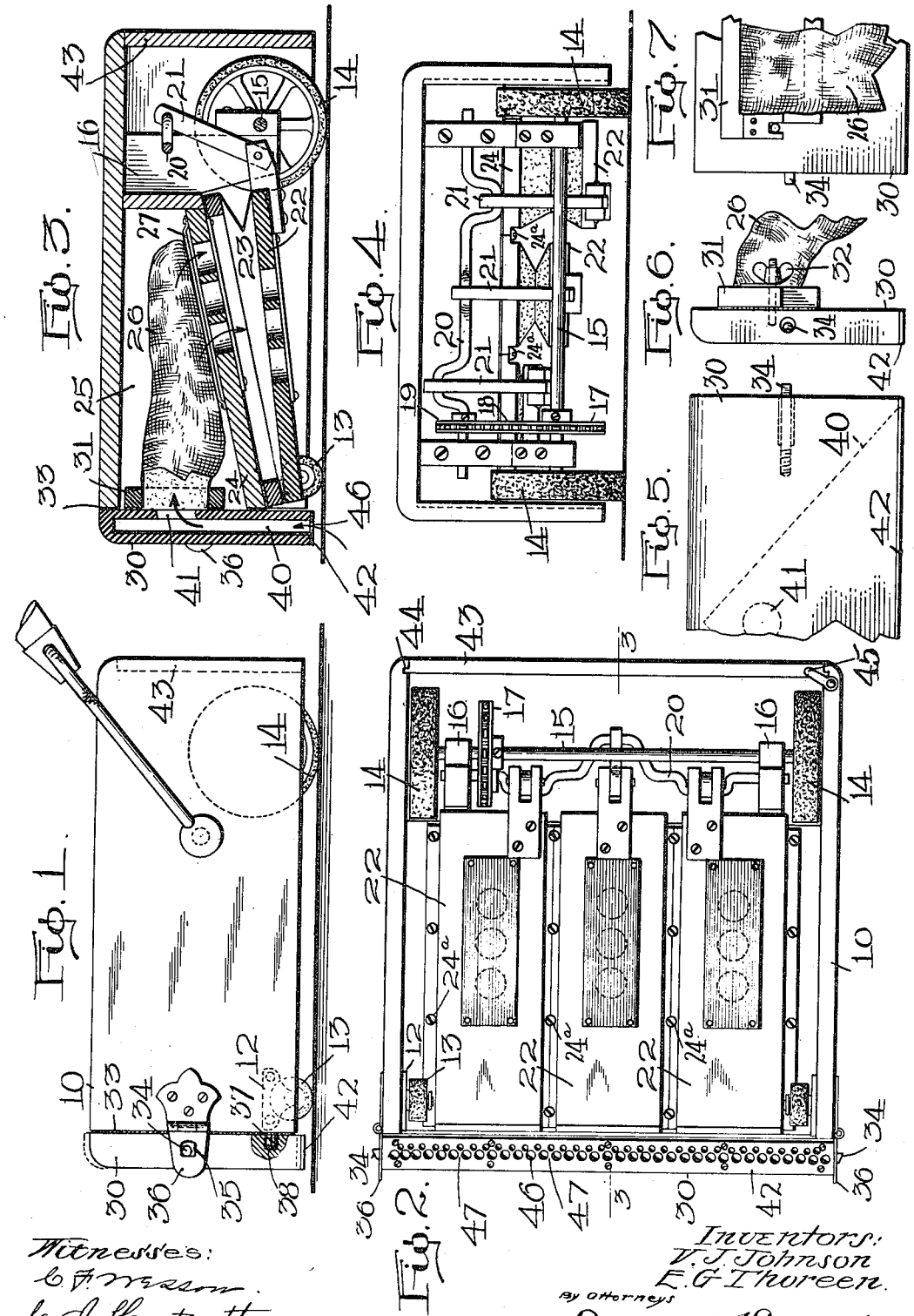

VICTOR J. JOHNSON AND ERIC G. THOREEN, OF WORCESTER, MASSACHUSETTS, ASSIGNORS, BY MESNE ASSIGNMENTS, TO THE TORRINGTON COMPANY, OF TORRINGTON, CONNECTICUT, A CORPORATION OF MAINE.

PNEUMATIC CARPET-SWEEPER.

1,303,818.   Specification of Letters Patent.   Patented May 13, 1919.

Application filed June 10, 1911, Serial No. 632,411. Renewed June 9, 1916. Serial No. 102,793.

*To all whom it may concern:*

Be it known that we, VICTOR J. JOHNSON and ERIC G. THOREEN, citizens of the United States, residing at Worcester, in the county of Worcester and State of Massachusetts, have invented a new and useful Pneumatic Carpet-Sweeper, of which the following is a specification.

The principal objects of this invention are to provide a construction of pneumatic carpet sweeper in a compact form and to increase the speed of operation so as to secure more power without increasing the size of the pneumatics for the purpose of assisting this object, also to provide a convenient and compact arrangement of the pneumatics and dust-bag; to provide an expeditious manner of removing and replacing the pneumatics; to provide an improved construction of inlet nozzle having an improved arrangement for permitting its use either on soft or hard carpets; and to provide other improvements in details of construction as will appear hereinafter.

Reference is to be had to the accompanying drawings; in which—

Figure 1 is a side view of a preferred embodiment of the invention;

Fig. 2 is a bottom plan view thereof;

Fig. 3 is a longitudinal sectional view on the line 3—3 of Fig. 2.

Fig. 4 is a rear elevation with the backplate removed.

Fig. 5 is a front elevation of a portion of the front plate or nozzle;

Fig. 6 is an end view thereof showing how the dust-bag is connected; and

Fig. 7 is a rear elevation of the same.

The invention is shown in a form in which the casing 10 is of a general rectangular form, and of small size. This casing is propelled as usual by bail and handle, or in any other desired way and is provided at the front with non-adjustable brackets 12 on which are casters 13 for supporting the front end. At the rear a pair of rubber tired supporting wheels 14 are arranged fixed on a transverse shaft 15. This shaft is provided with bearings in brackets 16 inside the casing.

In order to provide the desired compactness, this shaft is provided with a sprocket wheel 17 which by chain 18 drives a smaller sprocket wheel 19 on a shaft 20 located above the wheels. With the cranks of this crank shaft are connected a plurality of links 21 each extending downwardly from the crank shaft and inwardly so as to escape contact with the shaft 15 as the crank shaft is rotated. The lower end of each link is connected with the movable leaf 22 of a pneumatic 23. These movable leaves are located at the extreme bottom of the casing, being pivoted at the front so that when the pneumatics are expanded these leaves are almost parallel with the floor or supporting surface. Each pneumatic has an individual fixed leaf 24 located at an inclination. These fixed leaves have side ledges and are individually held in position by screws 24ª so that they can be removed very easily. In this construction it will be seen that the movement of the frame over the floor causes a motion of rotation to be transmitted to the crank from the wheels at an increased speed, so that the pneumatics 23 can be made smaller than usual, and yet on account of their increased speed they will afford the necessary power. At the same time this arrangement provides for locating the pneumatics at the bottom of the casing where they can be inspected, removed and repaired simply by turning the casing over and without providing any removable top plate or other means for getting access to them.

Another feature of importance due to this construction is the fact that the compartment 25 located over the pneumatics for containing the dust-bag 26 is not at the bottom of the casing, but is at the top so that when the dust-bag is removed it is in convenient position as it comes out of the casing and does not tend to fall to the floor and deposit dust back on the floor. In other words it is located where it can be taken out very conveniently. Also by having the bottom slant in the direction shown the bulk of the dust can be deposited near the entrance without clogging the mouth of the dust bag. This dust bag is located on the floor of the chamber 25 and is kept from the ports by means of a screen 27 extending over them. Its mouth is secured to a front plate 30 by means of a removable rectangular frame 31 having thumb nuts 32 for holding it in position.

The edge of the casing is provided with a packing 33 and the front plate 30 is provided with a pair of spring bars 34 secured at their inner ends and free to move at their outer ends for engaging in elongated slots 35 in pivoted catches 36 on the casing. The casing is also provided with pins 37 which enter vertically elongated slots 38 in the front plate. On account of this construction it will be seen that the front plate can be raised and lowered so that although the casters 13 are not adjustable the height of the front plate from the floor can be regulated easily to suit it for hard or soft carpets. The front plate constitutes in effect the nozzle as it is made hollow and is provided with an inlet passage 40 and an outlet passage 41, the latter, of course, opening into the interior of the frame 31. The inlet passage has at the end thereof a nozzle plate 42 having a row of perforations 46. These perforations are separated by integral partitions 47 arranged transverse to the length of the nozzle. Thus they form bridges in the plane of the bearing surface of the nozzle serving to hold the carpet down at intervals. With a long slot the air currents sometimes tend to draw portions of a soft or thin carpet into the slot, thus partially choking the nozzle, making the machine work hard, and preventing the most effective action at such a time. These difficulties are avoided by our construction, particularly when the perforations are made circular as shown. It is preferred also to arrange a second row of perforations alongside that already described, but alternating therewith so as to register with the integral partitions 47. These are shown smaller than the other perforations, and serve to remove the dust from the portions of the carpet passed over by the partitions.

It is to be observed also that the rear plate 43 is made slidable in ways 44 on the casing and is normally held in position by a light spring or catch 45. This is provided so that the rear of the machine can be inspected and repaired very easily. It does not disfigure the casing in any way.

From what has been said it will be seen that an extremely compact arrangement is secured which will provide all the necessary power, and that the dust bag is conveniently arranged for removal while the pneumatics are conveniently arranged for inspection, repairs, and cleaning.

While we have illustrated and described a preferred embodiment of the invention, we are aware that many modifications can be made therein by any person skilled in the art without departing from the scope of the invention as expressed in the claims. Therefore we do not wish to be limited to all the details of construction herein shown and described, but what we do claim is:—

1. In a pneumatic carpet sweeper, the combination with a casing provided with a dustbag compartment, of means for exhausting said compartment, a plate for closing the end of said compartment and casing, said plate having a passage therethrough and constituting a nozzle, and means on the casing for holding the nozzle or plate firmly against the edges of the casing in vertically adjusted positions, whereby the height of the nozzle above the supporting surface can be regulated.

2. In a pneumatic carpet sweeper, the combination of a casing with a removable nozzle therefor provided at opposite ends with spring locking pins in alinement, and hinged plates on the sides of the casing having openings for said pins for receiving them and holding the nozzle firmly against the casing.

3. In a pneumatic carpet sweeper, the combination with a casing having a dustbag compartment, a front plate for closing the front end of said compartment and casing, said front plate having a passage therethrough and constituting a nozzle, and provided with opposite spring locking pins, and hinged plates on the casing having openings wider than said pins for receiving them and holding the nozzle or front plate firmly against the front edges of the casing in vertically adjusted positions, whereby the height of the nozzle above the supporting surface can be regulated.

4. In a pneumatic carpet sweeper, the combination of a casing with a removable nozzle therefor provided with opposite spring locking pins, and hinged plates on the casing having openings for said pins for receiving them and holding the nozzle firmly against the casing.

5. In a pneumatic carpet sweeper, the combination with a casing having a dust bag compartment at the top and end thereof, a nozzle communicating with said compartment, pneumatics arranged along the bottom of said compartment and having movable leaves at their lower sides, links connected with said leaves and extending upwardly, a crank shaft located within said casing at the top thereof behind said compartment for operating said links, operating wheels within said casing at the bottom of the rear thereof and immediately below the crank shaft, and speed multiplying means for rotating said crank shaft from the wheels.

6. In a pneumatic carpet cleaner, the combination with a casing having a dust bag compartment at the top thereof, of a plurality of pneumatics arranged along the bottom of the casing, each having an individual leaf fixed immovably to the bottom of the dust bag compartment, and a movable leaf, a nozzle communicating with said compartment, and means for operating the pneumatics.

7. In a pneumatic carpet cleaner, the combination with a substantially horizontal topped casing having a dust bag compartment at the top thereof, said dust bag compartment having a slanting bottom, of a plurality of pneumatics arranged along the bottom of the casing, each having an individual inclined leaf fixed immovably to the bottom of the dust bag compartment, and a movable leaf pivoted at the bottom of said incline, a nozzle communicating with said compartment, and means for operating the pneumatics.

In testimony whereof we have hereunto set our hands, in the presence of two subscribing witnesses.

VICTOR J. JOHNSON.
ERIC G. THOREEN.

Witnesses:
ALBERT E. FAY,
C. FORREST WESSON.